United States Patent
Kreishan (10) Patent No.: US 11,082,838 B2
(45) Date of Patent: Aug. 3, 2021

(54) EXTENSIBLE AUTHENTICATION PROTOCOL WITH MOBILE DEVICE IDENTIFICATION

(71) Applicant: CHARTER COMMUNICATIONS OPERATING, LLC, St. Louis, MO (US)

(72) Inventor: Loay O. Kreishan, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 278 days.

(21) Appl. No.: 16/055,872

(22) Filed: Aug. 6, 2018

(65) Prior Publication Data
US 2020/0045541 A1 Feb. 6, 2020

(51) Int. Cl.
*H04W 12/06* (2021.01)
*H04L 29/06* (2006.01)

(52) U.S. Cl.
CPC ........... *H04W 12/06* (2013.01); *H04L 63/083* (2013.01); *H04L 63/0876* (2013.01); *H04L 63/0892* (2013.01); *H04L 63/18* (2013.01)

(58) Field of Classification Search
CPC ... H04L 63/0876; H04L 63/083; H04L 63/18; H04L 63/0892; H04L 63/0272; H04W 12/06
USPC .......................................................... 726/7
See application file for complete search history.

(56) References Cited

U.S. PATENT DOCUMENTS

| 2015/0326561 A1* | 11/2015 | Shah | H04L 63/0815 |
| | | | 726/6 |
| 2017/0134941 A1* | 5/2017 | Naslund | H04L 63/08 |
| 2019/0007236 A1* | 1/2019 | Ishii | H04L 12/4641 |
| 2019/0116493 A1* | 4/2019 | Cyril | H04W 8/02 |
| 2019/0268335 A1* | 8/2019 | Targali | H04W 12/1006 |

OTHER PUBLICATIONS

Network Working Group; Aboba et al. "Extensible Authentication Protocol (EAP)", The Internet Society, Jun. 2004.
Network Working Group; Arkko et al. "Extensible Authentication Protocol Method for 3rd Generation Authentication and Key Agreement (EAP-AKA)", The Internet Society, Jan. 2006.
Network Working Group; Haverinen et al. "Extensible Authentication Protocol Method for Global System for Mobile Communications (GSM) Subscriber Identity Modules (EAP-SIM)", The Internet Society, Jan. 2006.
Network Working Group; Aboba et al. "Extensible Authentication Protocol (EAP) Key Management Framework", The Internet Society, Aug. 2008.

* cited by examiner

*Primary Examiner* — Kambiz Zand
*Assistant Examiner* — Benjamin A Kaplan
(74) *Attorney, Agent, or Firm* — Meagher Emauel Laks Goldberg & Liao, LLP.

(57) ABSTRACT

Various embodiments comprise systems, methods, architectures, mechanisms, apparatus or protocols configured to provide seamless authentication of devices to secure networks via an Extensible Authentication Protocol (EAP) using credentials based on device information and/or service information visible to third party mobile services providers.

19 Claims, 5 Drawing Sheets

EXTENSIBLE AUTHENTICATION PROTOCOL WITH MOBILE DEVICE IDENTIFICATION

FIELD OF THE DISCLOSURE

The present disclosure generally relates to network security and, more particularly, to authenticating a device to a wireless network to enable delivery of network services to the device by the wireless network.

BACKGROUND

The Internet Engineering Task Force (IETF) Request for Comment (RFC) 3748 defines an Extensible Authentication Protocol (EAP) supporting extensible network access authentication of devices to a network. The EAP permits the use of a backend server such as an Authentication, Authorization, and Accounting (AAA) server to provide authentication services to an authenticator such as an access point, gateway and the like (i.e., execute EAP algorithms or methods for the authenticator, such as the known RADIUS and Diameter protocols).

IETF RFC 5247 updates IETF RFC 3748 by specifying an EAP key hierarchy and providing a framework for the transport and usage of keying material and parameters generated by EAP authentication algorithms/methods, along with key management guidelines.

Mobile Network Operators (MNOs) typically authenticate devices in accordance with the EAP-SIM protocol (Extensible Authentication Protocol Method for Global System for Mobile Communications (GSM) Subscriber Identity Modules per IETF RFC 4186) or EAP-AKA protocol (Extensible Authentication Protocol Method for 3rd Generation Authentication and Key Agreement per IETF RFC 4187).

The above methods of authentication require access to network keys denoted as "triplets" that are only available in the MNOs' networks and typically stored on a Home Location Register (HLR) or Home Subscriber Service (HSS). Triplets are not available for use by third party mobile/network services providers, such as multiple system operators (MSOs), mobile virtual network operators (MVNOs), virtual network operators (VNOs), or mobile other licensed operators (MOLOs). As such, authentication of devices to such operators is problematic.

SUMMARY

Various deficiencies in the prior art are addressed by systems, methods, architectures, mechanisms, apparatus or protocols configured to provide seamless authentication of devices to secure networks via an Extensible Authentication Protocol (EAP) using credentials based on device information and/or service information visible to third party mobile services providers.

A method of authenticating a device to a network service provider (NSP) according to one embodiment comprises: receiving, at an authenticator, a message indicative of a user device (UD) in communication with an access point (AP) and having provided thereby an Extensible Authentication Protocol (EAP) response including an outer identity associated with the NSP; establishing a secure communications tunnel to the UD; transmitting, via the secure communications tunnel, a request for inner identity and password information stored at the UD; requesting, from a device management server, device information with service status associated with the UD; and authenticating the UD to the NSP in response to receiving inner identity information matching received device information for a device having active status.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Generally speaking, various embodiments provide authentication of user devices to a network via an Extensible Authentication Protocol (EAP) that uses existing device information for authenticating a user device such as a mobile phone to a network of a third-party mobile/network services provider in a manner avoiding the use of hidden authentication information such as retained by an initial MSO associated with the user device.

Figure 1:
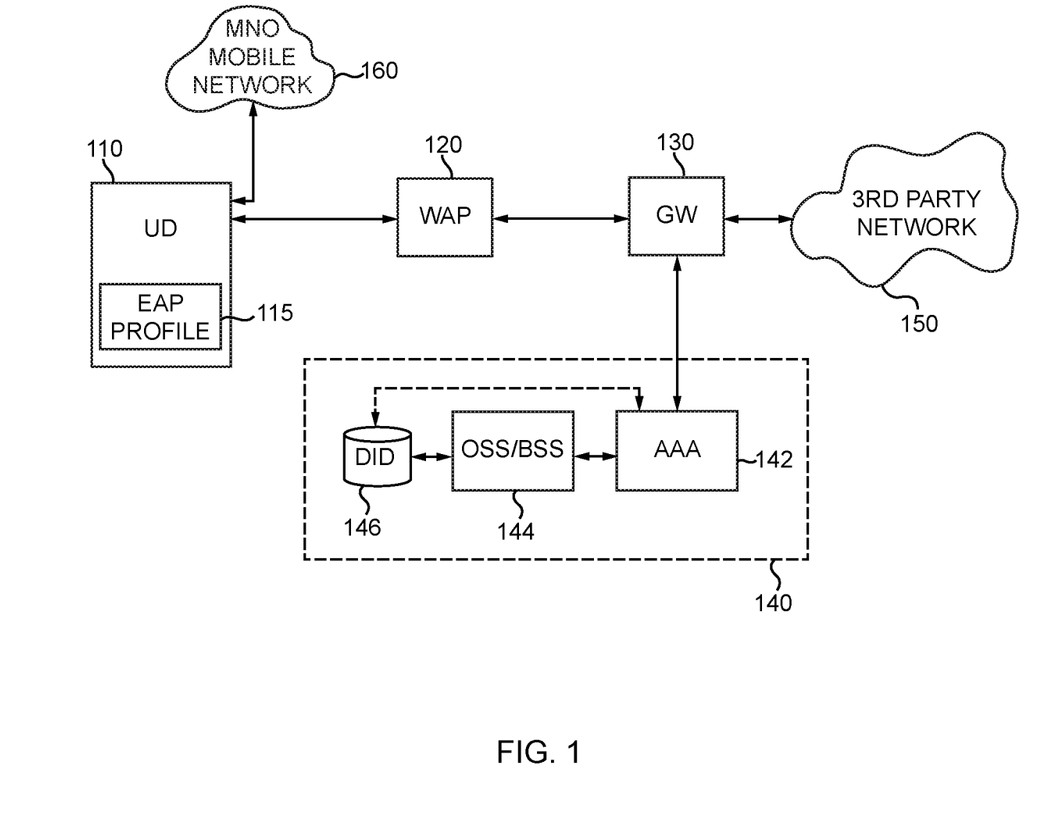
FIG. 1 depicts a high-level block diagram of a system benefiting from various embodiments.

FIG. 1 depicts a high-level block diagram of a system benefiting from various embodiments. The system 100 of FIG. 1 depicts a user device (UD) 110 (e.g., a smartphone, laptop computer, tablet computer or other mobile device, an Internet of Things (IoT) sensor or some other device utilizing network services) capable of communicating with a radio network controller (RNC) and/or various other provider equipment (PE) (not shown) associated with a mobile network 160 to access therefrom various network services such as voice services, data services, video services, monitoring services and/or other services. The mobile network 160 may be associated with a Mobile Network Operator (MNO) and may comprise, illustratively, a 3G/4G mobile network such as a 3GPP network, Universal Mobile Telecommunications System (UMTS) network, Long-Term Evolution (LTE) network, a 5G mobile network and/or some other type of mobile network.

The user device 110 is also depicted as communicating with provider equipment (PE) associated with third party network 150 to access therefrom various network services. Specifically, UD 110 is depicted as communicating with a Wireless Access Point (WAP) 120, which is depicted as communicating with a gateway 130, which is coupled to the third party network 150. The third party network 150 may comprise a mobile network such as described above with respect to the mobile network 160, a terrestrial network, an access network, a core network or some other network.

The gateway 130 is depicted as communicating with various network elements at a Network Operations Center (NOC) 140; namely, an authentication, authorization and accounting (AAA) server 142 in communication with (or implementing) a NSP device management server/function, such as an Operations Support System (OSS), Business Support System (BSS) (or similar function) 144 and/or a corresponding Device Information Database (DID) 146. For purposes of this discussion, other network management and/or NOC functions are omitted for simplicity.

Authentication of UD 110 to the mobile network 160 of the MNO may be performed in accordance with the EAP-SIM protocol (Extensible Authentication Protocol Method for Global System for Mobile Communications (GSM) Subscriber Identity Modules per IETF RFC 4186) or EAP-AKA protocol (Extensible Authentication Protocol Method for 3rd Generation Authentication and Key Agreement per IETF RFC 4187).

The UD 110 is also depicted as having installed thereon an EAP Profile 115 including information required to authenticate the UD 110. The EAP profile 115 may be installed on the UD 110 as or via an application (e.g., mobile phone app, Windows/Mac application and the like), via sideloading through a port or access mechanism (e.g., NSP-provided USB stick, download from WAP, provided via the SIM card with the provider profile and the like) by some other means.

The EAP profile 115 contains a specific outer identity associated with a NSP from which the UD 110 may be authorized to receive network services. In addition, the EAP profile outer identity 115 may contain optional realm information suitable for authenticating a roaming UD 110, such as providing information that a home authentication server uses to identify the device type, session type and/or home provider within heterogeneous networks. In the case of roaming between private networks, the realm may be used by a NSP in communication with the UD 110 to identify the appropriate home provider and either proxy a request to that home provider or provide network services directly to the UD 110.

The EAP profile 115 contains a specific inner identity and password information associated with the UD 110, which may comprise credential variables (fields) representing device information, device identity, service information and the like which are used during authentication processing in accordance with the various embodiments. The value or name of these credential variables may be provided via the profile or the UD will provide or substitute the name for the value with the actual value when provisioning the profile. Generally speaking, the value or name of these credential variables may be provided to the UD 110 when the EAP profile 115 is provisioned (installed), during the process of authenticating the UD 110 to a NSP or at some other time. The username and password can be presented as variables in the profile or during authentication. The value of these variables may be provided by the device OS during the authentication.

In some embodiments, the profile 115 initially includes a number of unpopulated credential variables/fields including at least those associated with a service provider of interest. An app, application, script or other program loading into and executed by the user device 110 is configured to identify the unpopulated (i.e., blank) credential variables/fields within the profile 115 and extract information from the user device such as MEID, MAC address, DEVID, IMEI, IMSI, MSISDN and/or some other information identified as appropriately included within the profile.

In addition, the username and password can be presented as credential variables/fields in the profile or during authentication. The value of these variables may be provided by the user device operating system (OS) during the authentication process or during some other process (e.g., during a basic provisioning process).

In some embodiments, the profile 115 is pre-populated in that the user device is pre-configured by the service provider, such as a provider-branded phone locked to a particular provider.

Different service providers may require different credential information associated with a user to enable authenticating the user device to their respective networks. In this case, the profile need only be populated with the credential variables/fields relevant to a service provider of interest. Moreover, the specific credential variables/fields relevant to a service provider of interest may be identified during the process of attempting to access the provider network such as during a session setup operation.

The inner identity generally comprises any combination of device information or service information that is visible to a network service provider (NSP) interacting with a UD 110 to provide network services thereto, such as device type, device capability, session type, account information, assigned or generated identifiers and so on. For example, various embodiments contemplate an inner identity of a UD 110 as comprising one or more of mobile equipment identifier (MEID), Media Access Control address (MAC address) and/or some other device identifier (DEVID) either alone or in combination with, illustratively, International Mobile Station Equipment Identity (IMEI) of the user device. Various embodiments contemplate the inner identity of the UD 110 as further comprising other information assigned to the UD 110 by the service provider, such as International Mobile Subscriber Identity (IMSI), Mobile Station International Subscriber Directory Number (MSISDN) and the like.

The password is generally selected from device or service information such as described above with respect to the inner identity. To enhance security, a hash algorithm with Salt may be used such that the password may comprise a hash of one or more of the populated credential variables representing device information, device identity, service information and the like.

In various embodiments, for linking device authentication with server status, a user name may be selected from the relevant service information, while the password is selected from or linked to the device information.

In various embodiments, such as web portal provisioning, the NSP may use a token to enhance security. Various embodiments contemplate the use of tokens such as provided at time of registration of a UD 110 to a NSP such as a public NSP.

Various embodiments contemplate both private network provisioning and public network provisioning as will be discussed in more detail below. Generally speaking, the authentication methodologies discussed herein utilize a two stage protocol with a first stage to establish a strong TLS tunnel to exchange authentication credentials, and a second stage to authenticate the credentials with AAA server via that secure tunnel. The first secure tunnel within which authentication information is communicated between the user device and authenticating entity and a second secure tunnel to provide services upon authentication of the UD to the NSP. The authenticating entity may declare a EAP authentication type during a first EAP request. A native function such as a connection manager may select the credentials based on the EAP profiles or based on the EAP authentication type in the declaration. Generally the username, if it exists, will be the MSISDN or a token for new subscribers until they get an MSISDN.

The password can be any device information, hash of device information and the like (e.g., IMEI). If a token is used, it can be used as username or password, or hashed or appended to the password or username. Different implementations are contemplated by the inventors, such as in response to network service provider needs or practices.

Seamless authentication can be used to access secure networks like Wi-Fi, CBRS, LTE networks and can be used in Passpoint Wi-Fi.

Figure 2:
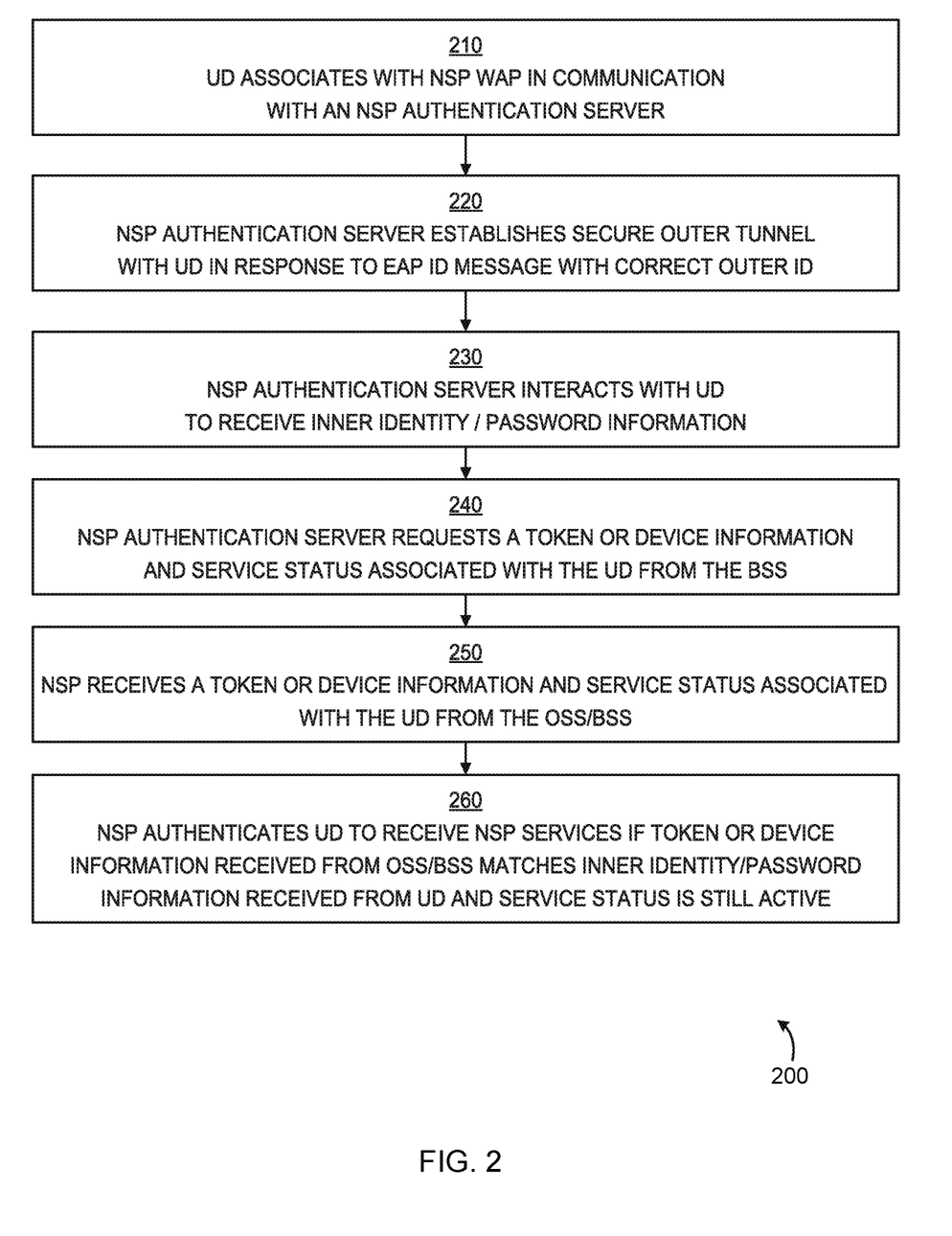
FIG. 2 depicts a high-level block diagram of an exemplary wireless device suitable for use in the various embodiments.

FIG. 2 depicts a flow diagram of a provisioning method according to various embodiments. Specifically, the method 200 of FIG. 2 depicts interactions between a UD 110 communicating with provider equipment of network services provider to enable authentication of the UD 110 to the PE of the NSP to receive network services therefrom. It is noted that provisioning method 200 of FIG. 2 is related to the system 100 of FIG. 1 as well as the call flow methodologies depicted below with respect to FIGS. 3-4, and that these figures may be referenced together as part of this discussion. Further, for purposes of this discussion it will be assumed that the UD 110 comprises a mobile device in communication with a Wireless Access Point (WAP) 120 associated with the NSP. In particular, the UD 110 is depicted as interacting with an authentication server such as AAA 142 or similar authenticating entity within the NSP by intervening PE such as WAP 120, gateway 130 and/or other control or routing network elements (not shown) associated with the PE of the NSP.

At step 210, a UD associates with a WAP in communication with an NSP authentication server, such as AAA 142. As depicted herein, the WAP 120 communicates with the AAA 142 via a gateway and, possibly, other intervening network elements (not shown).

At step 220, the NSP authentication server establishes a secure tunnel between the NSP authentication server and the UD in response to receiving an EAP ID message including a correct outer ID. That is, the received EAP ID message includes outer identity information associated with the NSP (i.e., provider identity, optional realm information and the like) and, in response, the authentication server interacts with the UD to establish a secure tunnel between the authentication server and the UD.

At step 230, the NSP authentication server interacts with the UD via the secure tunnel to receive inner identity information, password information and/or other information (e.g., preloaded tokens, wherein using UD credentials the authenticator will start the authentication process with the authentication server).

At step 240, the NSP authentication server requests a token or device information and service status associated with the UD from a subscriber database device manager such as OSS/BSS 144 for processing.

At step 250, the OSS/BSS provides a token or device information (e.g., IMEI, MEID, IMSI, MSISDN, DEVID etc.) and an indication of whether the service status associated with the USD is active or suspended.

At step 260, the NSP authentication server determines that the UD should be authenticated if the token or device information received from the OSS/BSS matches the inner identity/password information received from the UD and the service status is still active, in which case the NSP authentication server authenticates the UD (approves the request from the authenticator) to enable NSP services delivery to the UD.

Figure 3:
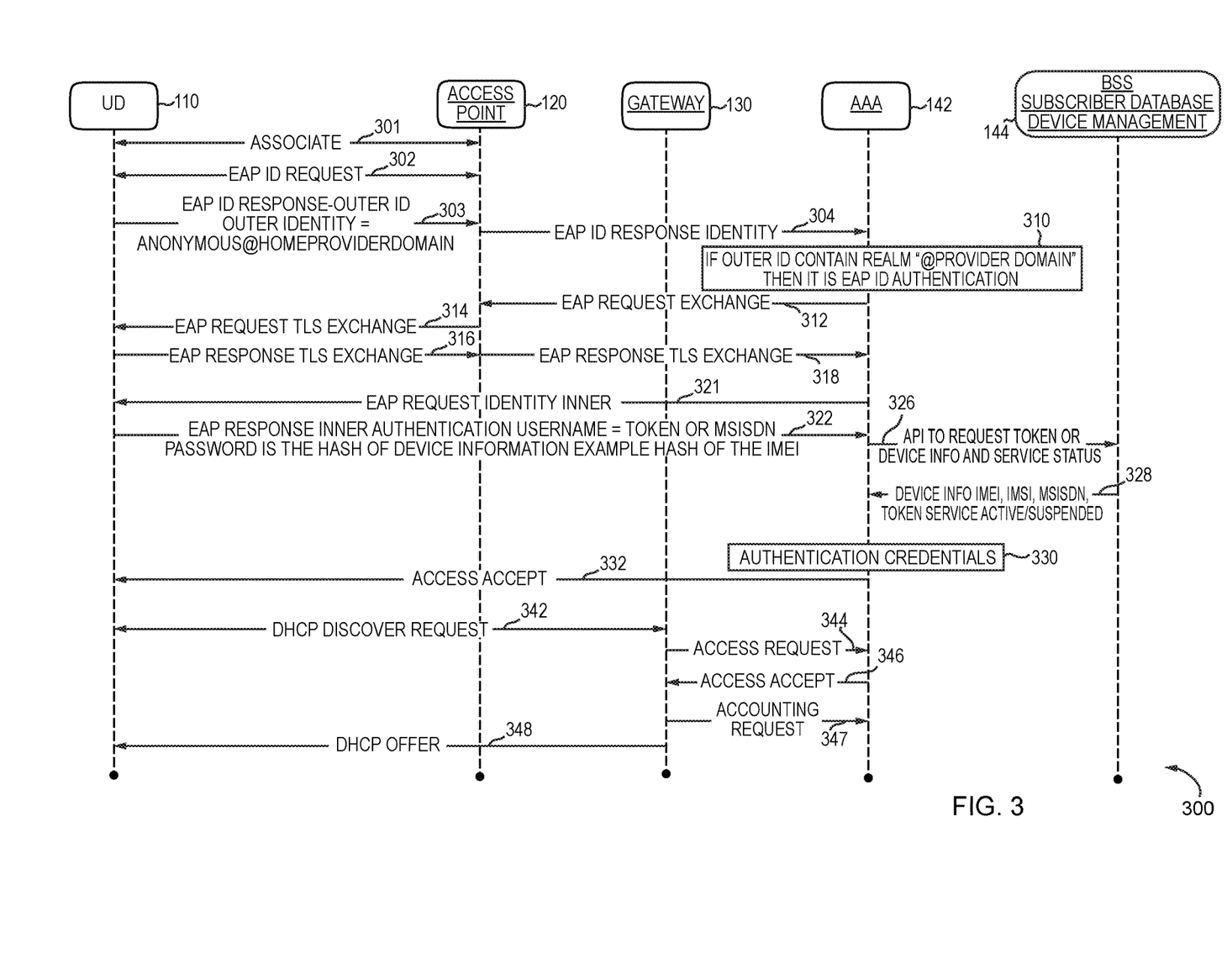
FIGS. 3-4 depict call flow diagrams of methods according to various embodiments depicts a method according to one embodiment.

FIG. 3 depicts a call flow diagram of a method according to various embodiments and useful in understanding the operations depicted above with respect to FIGS. 1-2. In particular, FIG. 3 depicts a call flow method 300 wherein messages are transmitted between a user device 110 such as a mobile phone and provider equipment (PE) associated with a Mobile Network Operator (MNO), mobile virtual network operators (MVNOs, virtual network operators (VNO), mobile other licensed operators (MOLO) or some other network services provider implementing a user device authentication protocol such as described herein.

Specifically, in the illustrative call flow diagram 300 of FIG. 3, the user device 110 is depicted as communicating directly with an access point 120 (illustratively a wireless or wireline access point, LTE, 3G or any other type of network), which in turn is depicted as communicating directly with a gateway 130, which in turn is depicted as communicating directly with an authentication server such as an Authentication, Authorization, and Accounting (AAA) server 142, which in turn is depicted as communicating directly with an OSS/BSS 144. The exemplary network elements (NEs) are for illustrative purposes only and may be modified as known to those skilled in the art depending upon the type of network supported by the provider equipment, the type of network provider and so on.

At step 301, after discovering AP 120 and a standard manner, the UD 110 associates with the AP 120 in a standard manner by transmitting an "associate request" command to the AP 120, and receiving from the AP 120 a, "association response" message. In this manner, initial communications between a user device 110 such as mobile phone and an 802.11 WAP or similar PE are established.

At step 302, the AP 120 transmits an "Extensible Authentication Protocol (EAP) ID Request" to the UD 110. In response, at step 303 the UD 110 transmits a "EAP ID Response" to the AP 120, which response includes an outer identity (optionally with realm information) such as in the form of "anonymous@HomeProviderDomain" where "HomeProviderDomain" is associated with the "home" network services provider from which the user device is requesting services, such as the NSP currently interacting with the UD, a different home NSP associated with the UD and the like. The outer identity may contain a realm that a home authentication server uses to identify the session type and home provider within heterogeneous networks.

At step 304, the AP 120 transmits an "EAP ID Response Identity" message to the AAA 142, which determines (310) whether the correct outer identity information was provided, such as the specific outer identity or realm of the NSP. If the correct outer identity information was provided, then AAA 142 transmits (312) an "EAP Request Transport Layer Security (TLS) Exchange" message to AP 120 for forwarding (314) to the user device 110. In response, the UD 110 transmits (316) a "EAP Response TLS Exchange" message to the AP 120 for forwarding (318) to the AAA 142. In this manner, a secure outer tunnel is established within which credential information may be securely transferred between the UD 110 and AAA 142.

At step 321, the AAA 142 transmits via the secure tunnel a "EAP Request Identity Inner" message to the UD 110 to request thereby inner identity information, password information and/or other information (e.g., preloaded tokens). At step 322, the UD 110 transmits a "EAP Response Inner Authentication" message including the requested identity information, password information and/or other information.

At step 326, the AAA 142 transmits to a subscriber database device manager, such as OSS/BSS 144, a request for a token or device information and service status associated with the UD 110. In response, the OSS/BSS 144 provides (328) a token or device information (e.g., IMEI, MEID, IMSI, MSISDN, DEVID etc.) and an indication of whether the service status associated with the USD 110 is active or suspended.

At step 330, the AAA 142 determines that the UD 110 should be authenticated if the information received from the OSS/BSS 144 matches inner identity/password information received from the UD 110, in which case the AAA 142 transmits (332) an "Access Accept" message to the UD 110 via a secure tunnel.

At step 342, the UD 110 transmits a dynamic host configuration protocol (DHCP) request to the gateway 130 to begin receiving network services from the NSP. The gateway 130 responsively transmits (344) an "access request" to the AAA 142, which responsively transmits (346) an "access accept" message to the gateway 130 indicating thereby authentication of UD 110 to the gateway 130.

The gateway 130 then transmits (347) an "accounting request" to the AAA 142 to ensure appropriate billing for services rendered, and transmits (348) a "DHCP offer" message to the UD 110 to enable appropriate access/configuration of the UD 110 to the PE of the NSP. At this point the UD 110 is authenticated and configured for receiving network services from the NSP.

Figure 4:
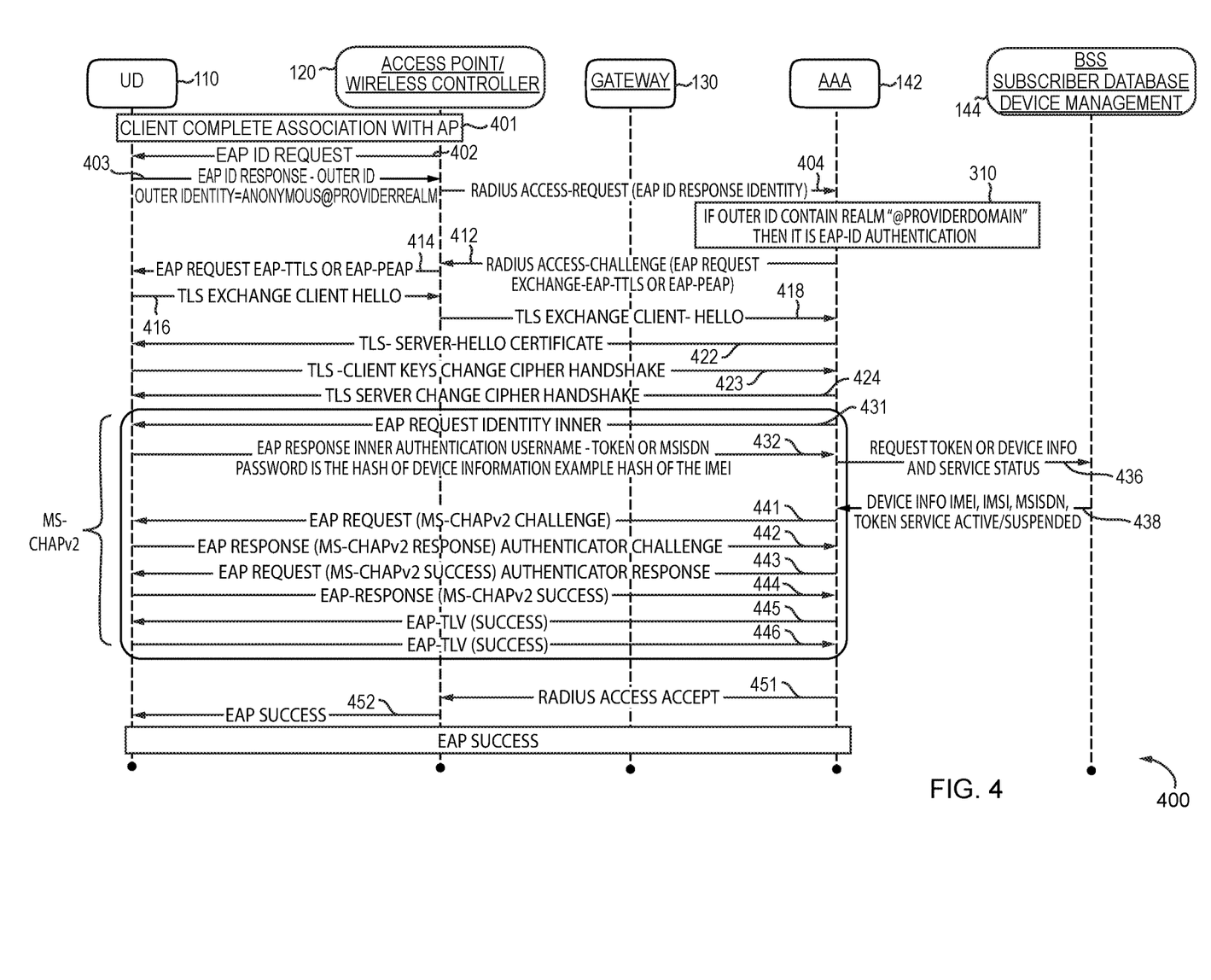

The above-described method 300 of FIG. 3 depicts a method of private network provisioning wherein the UD 110 is known to the NSP via account information or NSP-recognized tokens. The below-describe the method 400 of FIG. 4 depicts a method of public network provisioning wherein the UD 110 is not known to the NSP such that an on-line sign-up function (e.g., subscription portal or online sign-up server) is utilized to enable the UD 110 to purchase a desired service. After successfully purchasing the desired service, the subscription portal or online sign-up server provide to the UD 110 a token; the server may also provide a mechanism to provision device information, a phrase or text suitable for use in the authentication processes described herein and so on.

FIG. 4 depicts a call flow diagram of a method according to various embodiments and useful in understanding the operations depicted above with respect to FIGS. 1-2.

At step 401, after discovering AP 120 and a standard manner, the UD 110 associates with the AP 120 in a standard manner by transmitting an "associate request" command to the AP 120, and receiving from the AP 120 a, "association response" message. In this manner, initial communications between a user device 110 such as mobile phone and an 802.11 WAP or similar PE are established.

At step 402, the AP 120 transmits an "Extensible Authentication Protocol (EAP) ID Request" to the UD 110. In response, at step 403 the UD 110 transmits a "EAP ID Response" to the AP 120, which response includes an outer identity (optionally with realm information) such as in the form of "anonymous@ProviderRealm" where "ProviderRealm" is associated with the network services provider from which the user device is requesting services, such as the provider domain name of the NSP currently interacting with the UD, a home NSP associated with the UD and the like. The outer identity may contain a realm that a home authentication server uses to identify the session type and home provider within heterogeneous networks.

At step 404, the AP 120 transmits an "EAP ID Response Identity" message to the AAA 142, illustratively using the Remote Authentication Dial-In User Service (RADIUS) client/server protocol. The AAA 142 determines (310) whether the correct outer identity information was provided, such as the specific outer identity or realm of the NSP. If the correct outer identity information was provided, then AAA 142 transmits (412) an "EAP Request Transport Layer Security (TLS) Exchange" (EAP-TTLS) message or "EAP Protected Extensible Authentication Protocol (PEAP)" (EAP-PEAP) message to AP 120 for forwarding (414) to the user device 110. In response, the UD 110 transmits (416) a "EAP Response TLS Exchange Client Hello" message to the AP 120 for forwarding (418) to the AAA 142. The AAA 142 transmits (422) a "TLS-server-hello Certificate" to the UD 110. A flavor handshake is then performed by the UD 110 transmitting (423) to the AAA 142 a "TLS-Client Keys Change Cipher Handshake" and the AAA 142 transmitting (324) a "TLS-server Change Cipher Handshake" to the UD 110. In this manner, a secure outer tunnel is established within which credential information may be securely transferred between the UD 110 and AAA 142.

The various embodiments, different authentication protocols may be used. For example, in the illustrative embodiment of FIG. 4 the Microsoft version of the Challenge-Handshake Authentication Protocol (CHAP) is used; specifically MS-CHAPv2 as defined in IETF RFC 2759 and described below with respect to steps 431-446.

At step 441, the AAA 142 transmits via the secure tunnel a "EAP Request Identity Inner" message to the UD 110 to request thereby inner identity information, password information and/or other information (e.g., preloaded tokens). At step 442, the UD 110 transmits a "EAP Response Inner Authentication" message including the requested identity information, password information and/or other information. For example, the inner authentication username may comprise a token or MS ISDN, while a password may comprise a hash of device information such as the IMEI and/or other device information.

At step 436, the AAA 142 transmits to a subscriber database device manager, such as OSS/BSS 144, a request for a token or device information and service status associated with the UD 110. In response, OSS/BSS 144 provides (438) a token or device information (e.g., IMEI, MEID, IMSI, MSISDN, DEVID etc.) and an indication of whether the service status associated with the USD 110 is active or suspended.

The AAA 142 determines that the UD 110 should be authenticated if the information received from OSS/BSS 144 matches inner identity/password information received from the UD 110.

In one embodiment, if it is determined that the UD 110 should be authenticated, then the AAA 142 transmits (441) an "EAP-Request" (MS-CHAPv2 Challenge) to the UD 110, which then transmits (442) a "EAP-Response" (MS-CHAPv2 Response) "Authenticator Challenge" to the AAA 142.

If appropriate, the AAA 142 then transmits (443) a "EAP-Request" (MS-CHAPv2 Success) "Authenticator Response" to the UD 110, which then transmits (444) a "EAP-Response" (MS-CHAPv2 success) message to the AAA 142, after which the AAA 142 and UD 110 exchange (445, 446) "EAP-TLV" (Success) messages.

The AAA 142 then transmits (451) an "Access Accept" or "RADIUS Access Accept" message to the AP 120, which responsively transmits (452) an "EAP-Success" message to the UD 110.

In one embodiment, if it is determined that the UD 110 should be authenticated, then the method proceeds directly to step 451 where the AAA 142 transmits an "Access Accept" or "RADIUS Access Accept" message to the AP 120, which responsively transmits (452) an "EAP-Success" message to the UD 110. In this manner, the UD 110 is authenticated to the PE of the NSP.

As noted above with respect to the method 300 discussed above with respect to FIG. 3, the UD 110 may then transmit (342) a dynamic host configuration protocol (DHCP) request to the gateway 130 to begin receiving network services from the NSP. The gateway 130 responsively transmits (344) an "access request" to the AAA 142, which responsively transmits (346) an "access accept" message to the gateway 130 indicating thereby authentication of UD 110 to the gateway 130. Further, the gateway 130 then transmits (347) an "accounting request" to the AAA 142 to ensure appropriate billing for services rendered, and transmits (348) a "DHCP offer" message to the UD 110 to enable appropriate access/configuration of the UD 110 to the PE of the NSP. At this point the UD 110 is authenticated and configured for receiving network services from the NSP.

Figure 5:
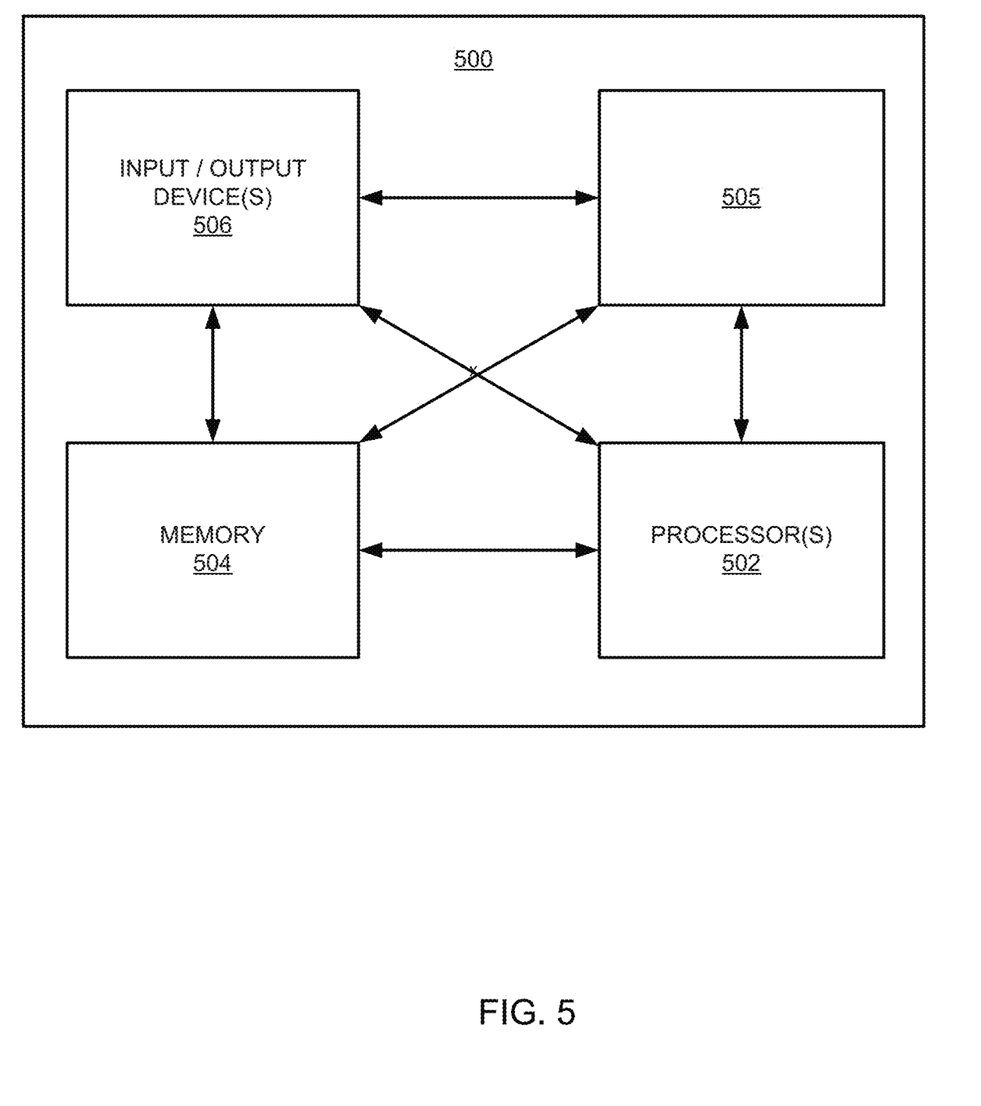
FIG. 5 depicts a high-level block diagram of a computing device suitable for use in performing functions described herein.

FIG. 5 depicts a high-level block diagram of a computing device suitable for use in performing functions described herein, such as implementing one or more of the functional elements described herein with respect to the various figures.

As depicted in FIG. 5, computing device 500 includes a processor element 503 (e.g., a central processing unit (CPU) or other suitable processor(s)), a memory 504 (e.g., random access memory (RAM), read only memory (ROM), and the like), a cooperating module/process 505 (e.g., network transceivers), and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive, solid state drive and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof

What is claimed is:

1. A method of authenticating a device to a network service provider (NSP), comprising:
  receiving, at an authentication server, a message indicative of a user device (UD) in communication with an access point (AP) and having provided thereby an Extensible Authentication Protocol (EAP) response including an outer identity associated with the NSP and included in an EAP profile stored at the UD;
  establishing a secure communications tunnel to the UD;
  transmitting, via the secure communications tunnel, a request for inner identity and password information included in the EAP profile stored at the UD;

requesting, from a device management server, device information with service status associated with the UD; and authenticating the UD to the NSP in response to receiving inner identity information matching received device information for a device having active status.

2. The method of claim 1, wherein the inner identity information comprises one or more of a mobile equipment identifier (MEID) and a Media Access Control address (MAC address) of the UD.

3. The method of claim 2, wherein the inner identity information further comprises an International Mobile Station Equipment Identity (IMEI) of the UD.

4. The method of claim 2, wherein the inner identity information further comprises information assigned to the UD by the NSP.

5. The method of claim 4, wherein the information assigned to the UD by the NSP comprises an International Mobile Subscriber Identity (IMSI).

6. The method of claim 4, wherein the information assigned to the UD by the NSP comprises a Mobile Station International Subscriber Directory Number (MSISDN).

7. The method of claim 1, wherein the password comprises a hash value generated using one or more credential variables representing device information, device identity and service information.

8. The method of claim 1, wherein the password comprises a hash value generated using one or more a mobile equipment identifier (MEID) and a Media Access Control address (MAC address) of the UD.

9. The method of claim 8, wherein the hash value is generated using an International Mobile Station Equipment Identity (IMEI) of the UD.

10. The method of claim 9, wherein the hash value is generated using information assigned to the UD by the NSP.

11. The method of claim 10, wherein the information assigned to the UD by the NSP comprises an International Mobile Subscriber Identity (IMSI).

12. The method of claim 10, wherein the information assigned to the UD by the NSP comprises a Mobile Station International Subscriber Directory Number (MSISDN).

13. The method of claim 1, wherein the authenticator comprises one of an access point and a gateway in communication with said UD.

14. The method of claim 13, wherein the device management server comprises at least one of a Device Information Database (DID), Operations Support System (OSS) and Business Support System (BSS).

15. The method of claim 1, wherein the EAP profile stored at the UD comprises information provided by the NSP via one or more of an application and a sideloading.

16. A network service provider (NSP) authentication apparatus configured to communicate with NSP provider equipment (PE) and comprising a processor configured for:

receiving, at the authentication apparatus, a message indicative of a user device (UD) in communication with an access point (AP) and having provided thereby an Extensible Authentication Protocol (EAP) response including an outer identity associated with the NSP and included in an EAP profile stored at the UD;

establishing a secure communications tunnel to the UD via NSP PE;

transmitting, via the secure communications tunnel, a request for inner identity and password information included in the EAP profile stored at the UD;

requesting, from a device management server, device information with service status associated with the UD; and authenticating the UD to the NSP in response to receiving inner identity information matching received device information for a device having active status.

17. The NSP authentication apparatus of claim 16, wherein the apparatus comprises one of an access point (AP), a gateway and an Authentication, Authorization, and Accounting (AAA) server.

18. The NSP authentication apparatus of claim 16, wherein the password comprises a hash value generated using one or more credential variables representing device information, device identity and service information.

19. A tangible and non-transitory computer readable medium storing instructions which, when executed by a computing device, cause the computing device to perform a method of authenticating a user device (UD) to a network service provider (NSP), the method comprising:

receiving, at an authentication server, a message indicative of a user device (UD) in communication with an access point (AP) and having provided thereby an Extensible Authentication Protocol (EAP) response including an outer identity associated with the NSP and included in an EAP profile stored at the UD;

establishing a secure communications tunnel to the UD;

transmitting, via the secure communications tunnel, a request for inner identity and password information included in the EAP profile stored at the UD;

requesting, from a device management server, device information with service status associated with the UD; and authenticating the UD to the NSP in response to receiving inner identity information matching received device information for a device having active status.

* * * * *